United States Patent [19]

Frazee, Jr. et al.

[11] Patent Number: 4,952,226
[45] Date of Patent: Aug. 28, 1990

[54] LIGHTGUIDE COATING CONTROL

[75] Inventors: Ralph E. Frazee, Jr., Bricktown; David H. Smithgall, Sr., East Windsor, both of N.J.

[73] Assignee: American Telephone and Telegraph Company, New York, N.Y.

[21] Appl. No.: 316,192

[22] Filed: Feb. 27, 1989

[51] Int. Cl.$^5$ ............................................. C03B 37/23
[52] U.S. Cl. ................................. 65/3.12; 356/73.1; 356/381
[58] Field of Search ................ 65/3.12; 356/73.1, 381, 356/384; 250/550, 560; 358/101; 427/10, 163, 166, 167

[56] References Cited

U.S. PATENT DOCUMENTS

| | | | |
|---|---|---|---|
| 4,027,977 | 6/1977 | Frazee et al. | 356/73.1 |
| 4,210,431 | 7/1980 | Balman et al. | 65/3.12 |
| 4,450,333 | 5/1984 | Andrejco | 219/10.49 |

FOREIGN PATENT DOCUMENTS

| | | | |
|---|---|---|---|
| 2114061 | 10/1971 | Fed. Rep. of Germany | 356/381 |
| 2493302 | 5/1982 | France | 65/3.12 |
| 58-140605 | 8/1983 | Japan | 351/381 |
| 1006402 | 3/1983 | U.S.S.R. | 65/3.12 |

OTHER PUBLICATIONS

Greenlad, "Measument & Control of the Thickness of Thin Films", Vacuum, vol. II, No. 3, 7/1952 pp. 216-230.

Smithgall, D. H. et al., "High–Speed Meaurement and Control of Fiber–Coating Concentricity", *The Bell System Technical Journal*, vol. 60, No. 9, 11/81, pp. 2065-2080.

Eichenbaum, B. R., "The Centering of Optical Fiber Coatings by Monitoring Forward Scattering Patterns—Theory and Practice", *The Bell System Technical Journal*, vol. 59, No. 3, 3/80, pp. 313.

Watkins, L. S., "Scattering From Side-Illuminated Clad Glass Fibers for Determination of Fiber Parameters", *Journal of the Optical Society of America*, vol. 64, No. 6, 6/74, pp. 767-772.

Primary Examiner—Peter Kratz
Attorney, Agent, or Firm—R. B. Anderson

[57] ABSTRACT

A laser (20) directs a laser beam at an optical fiber (12) and the resulting forward-scattered light is detected by a detector (21). The energy of the foward-scattered laser light is monotonically inversely proportional to the thickness of a carbon coating on the optical fiber. A computer (22) generates an electrical signal for controlling carbon coating thickness by driving a valve (24) to control the flow of acetylene from a source (14) used to coat the optical fiber in a coating chamber (13).

8 Claims, 3 Drawing Sheets

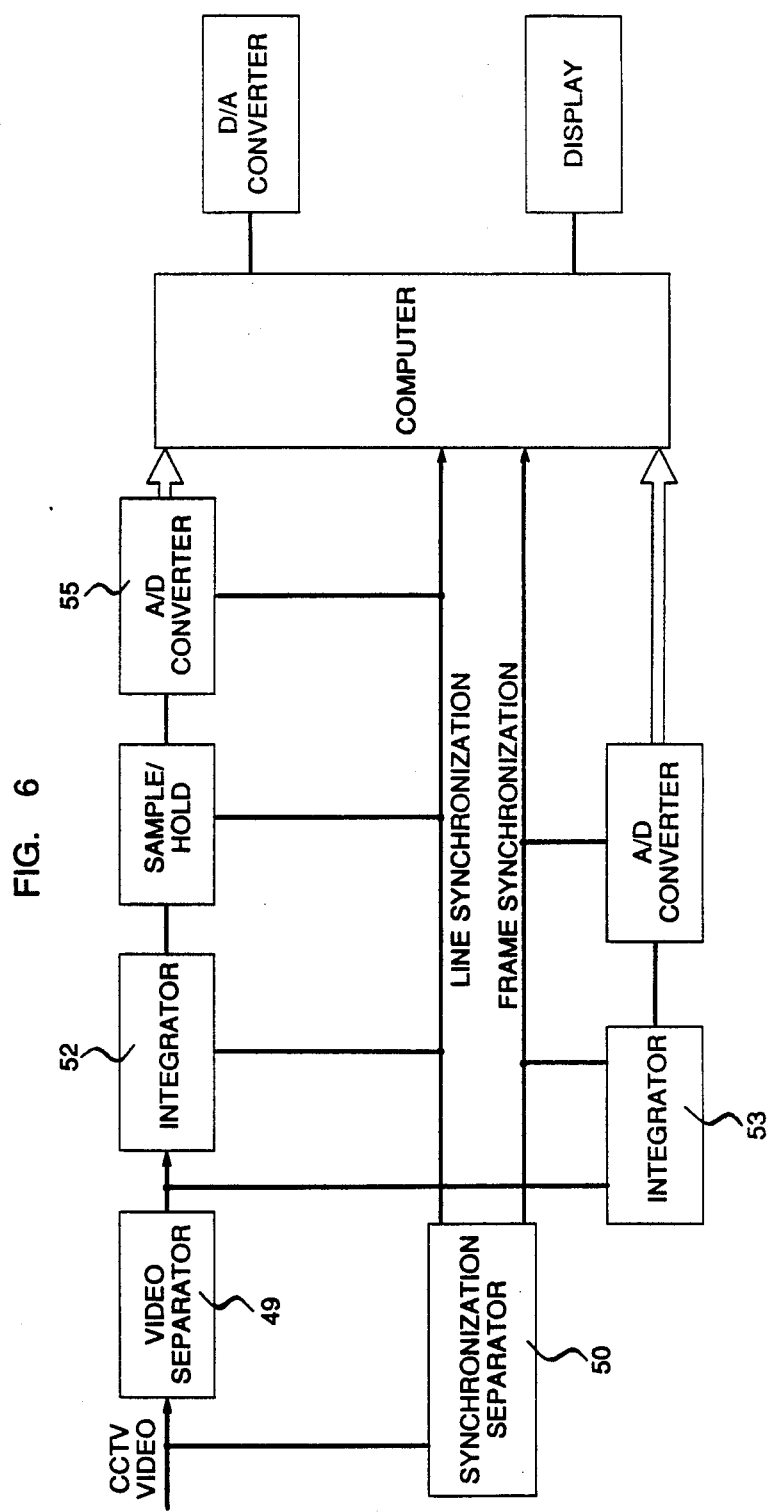

LIGHTGUIDE COATING CONTROL

TECHNICAL FIELD

This invention relates to methods for making optical fibers and, more particularly, to methods for measuring and controlling thin carbonaceous coatings during optical fiber fabrication.

BACKGROUND OF THE INVENTION

Primarily because of their use in optical communications systems, the fabrication of optical fibers has been a subject of intensive research and development. Optical fibers are typically made in a continuous process which involves drawing the thin glass strand or fiber from a partially molten glass preform, and thereafter coating it with a polymer to increase its structural strength. The U.S. Patent of Andrejco et al., 4,450,333, describes in detail a furnace of the type that can be used for heating a glass preform to permit a fiber to be drawn.

Optical fibers as presently made are still much more fragile than metal conductors, and they are subject to increased light transmission loss due to hydrogen contamination. Contamination is particularly a problem if the optical fiber is used as part of an underwater cable because permeation by water or OH radicals may result in an undesired reaction with the glass (silicon dioxide) optical fiber and because, in that environment, fiber replacement or repair is comparatively inconvenient and expensive. The copending application of DiMarcello et al., Ser. No. 098,253, filed Sept. 18, 1987, and assigned to Bell Telephone Laboratories, Inc. (hereby incorporated herein by reference ), describes a method for hermetically sealing the optical fiber by coating it with a thin carbon film. The fiber is coated by exposing the hot fiber from the furnace to an atmosphere of, for example, acetylene and other gases, which results in a carbonaceous coating having a form which is particularly reliable and effective in protecting the glass fiber from contamination. In particular, with the method described, the coating results in a cross-linked carbon network which increases the strength of the fiber as well as providing protection.

One problem with using the DiMarcello et al. method is the difficulty of monitoring the fiber during production to assure that a carbon coating of the proper thickness is being applied. Since the coating is only 500 to 1000 angstroms thick, normal mechanical methods of monitoring coating thickness cannot be used. Presently, coating thickness is determined by measuring the electrical conductivity along samples of the optical fiber. Since both the glass fiber and the polymer coating are non-conducting, electrical conductivity along the sample length is a function of the carbon thickness. This is normally a destructive testing method, in that it requires separation of the fiber sample from the fiber under production. There is thus a need for a simple and accurate method of determining carbon coating thicknesses on optical fibers, and preferably a method that is nondestructive to the optical fiber. Further, there is a need for such measurement in a way that would provide feedback during the production for adjusting coating thickness during a continuous production process to assure that it remains within prescribed limits.

SUMMARY OF THE INVENTION

We have found that when an appropriate laser beam is directed at an optical fiber containing a carbon coating, the energy of the forward-scattered laser light is monotonically inversely proportional to the thickness of the carbon coating. As a consequence, the coating thickness can be measured during production of the fiber and such information used to modify the coating thickness as the coating is applied. The energy in the forward scattered modes can be conveniently monitored by intercepting laser light with a screen, directing a TV camera at the screen and monitoring the intensity of the received light after blanking out the light of the unscattered laser beam. Moreover, this measurement may be made through the use of equipment that is already installed for the purpose of monitoring the concentricity of the polymer coating. These and other objects, features, and advantages will be better understood from a consideration of the following detailed description taken in conjunction with the accompanying drawing.

BRIEF DESCRIPTION OF THE DRAWING

FIG. 6 is a schematic block diagram of apparatus for converting video signals from the apparatus of FIG. 5 into signals for controlling gas flow in the apparatus of FIG. 1.

DETAILED DESCRIPTION

Figure 1:
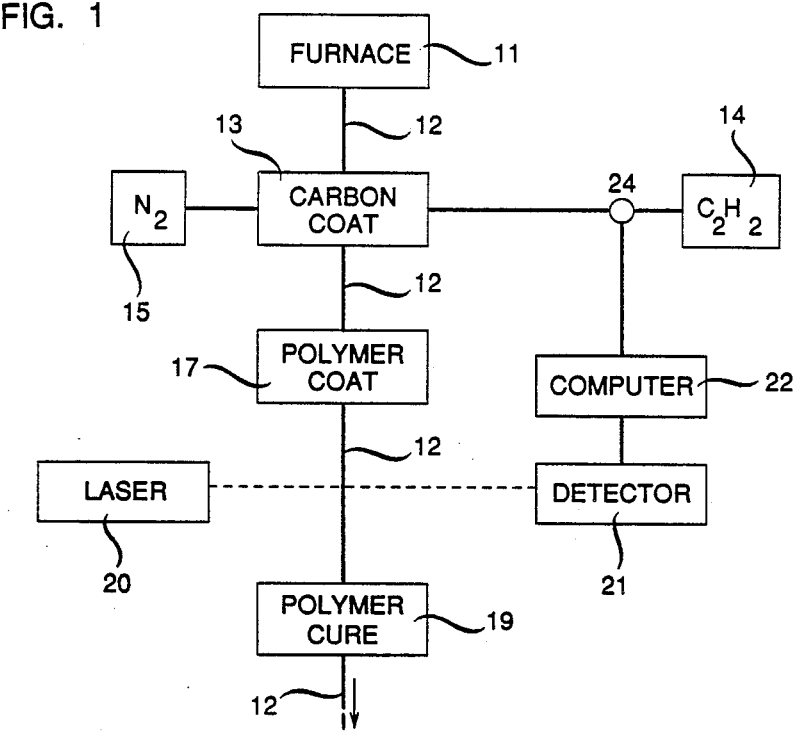
FIG. 1 is a schematic diagram of apparatus for fabricating optical fiber in accordance with one embodiment of the present invention.

Referring now to FIG. 1, there is shown, as a functional block diagram, apparatus for fabricating optical fiber in accordance with an illustrative embodiment of the invention. A draw tower in which the apparatus is used typically includes a furnace 11 into which a glass preform (not shown) is fed and from which an optical fiber 12 is drawn. The furnace may be of the general type described in the aforementioned patent of Andrejco et al., and may produce a temperature on the order of 2300° C. which partially melts the preform and which permits a glass fiber 12, typically 125 microns in diameter, to be drawn from the molten preform at a rate typically between two and ten meters per second.

As described in detail in the aforementioned DiMarcello et al. patent application, the heated fiber is then directed through a carbon coating chamber 13 in which it is subjected to a carbon-containing gas. For example, acetylene ($C_2H_2$) from a source 14 may be fed into the coating chamber 13 along with nitrogen from a source 15. As described in the DiMarcello et al. application, the object of the coating process is to deposit carbon on the optical fiber that is chemically bonded with silicon atoms of the glass fiber 12 and which produces a cross-linked carbon network having unsaturated bonds. The flow of the acetylene into the coating chamber 13 is preferably adjusted such that carbon coats on the optical fiber to a thickness of 500 to 1000 angstroms (0.05–0.1 microns). A typical acetylene flow rate is 3.5 liters per minute with a nitrogen flow of two liters per minute.

After the carbon coat, the fiber 12 is directed into a polymer coating applicator 17, which coats it in a known manner with a polymer such as an acrylate UV-curable coating. The diameter of the fiber with the polymer coating is typically 250 microns. Thereafter, the fiber is directed through a polymer curing station 19 which directs the outputs of ultraviolet lamps having a power adequate to cure the coating material on the fiber 12.

In accordance with the invention, prior to or after curing the polymer coating, a beam from a laser 20 is directed transversely at the optical fiber 12, and the forward-scattered laser light is detected by a light detector 21 which may be an array of photodetectors. As will be explained further later, we have found that the energy of the forward-scattered laser light is monotonically inversely proportional to the thickness of the carbon coating. The detector may mask unscattered direct light so as to detect only scattered laser light. Thus, the output of the detector is directed to a computer 22 which generates an appropriate signal for operating a valve 24 controlling the flow of acetylene to the coating chamber 13. The computer is programmed to increase the flow of acetylene in response to a forward-scattered light intensity which indicates that the coating is too thin; similarly, the computer signal drives the valve to reduce acetylene flow if the light intensity indicates that the coating is too thick. The monotonic inverse relationship of the detected light intensity to coating thickness of course constitutes part of the computer program. While the diagram shows the generated electrical signal as being used to control flow rate, it should be understood that it could be used as a direct measure of thickness and that an operator could use that information to correct gas flow.

Figure 2:
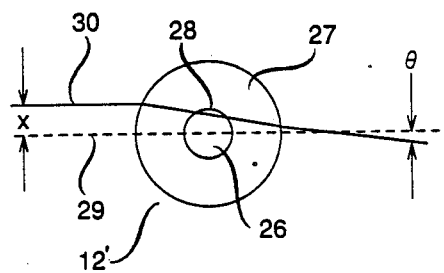
FIG. 2 is a schematic view of a laser ray passing through a section of optical fiber which illustrates certain aspects of the invention.
Figure 3:
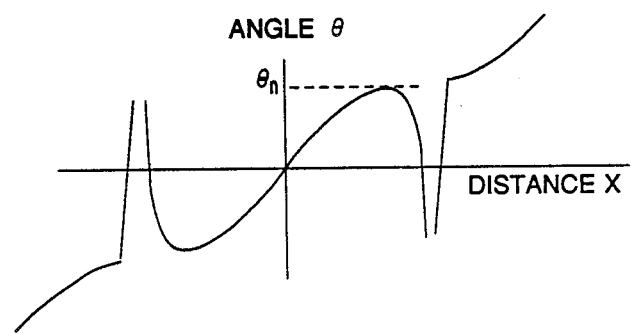
FIG. 3 is a graph of the scattering angle $\theta$ of FIG. 2 versus the distance x of the ray of FIG. 2 from a centerline of the fiber.
Figure 4:
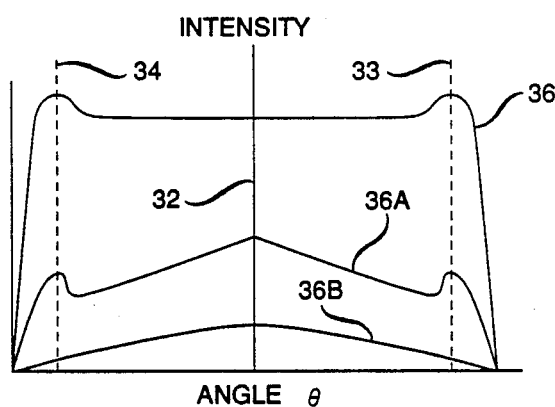
FIG. 4 is a graph of intensity of light passing transversely through an optical fiber versus angle $\theta$.

FIGS. 2 through 4 are presented to aid in an understanding of the principles of the invention. In FIG. 2 an optical fiber 12' (shown as a section taken transversely to the fiber's central axis) comprises an interior silica portion 26, an outer polymer portion 27, and a carbon coating 28 between the silica and the polymer portions. Line 29 is a center-line containing the axis of the optical fiber. Consider a pencil light ray 30 parallel to center-line 29 and displaced a distance x from the center-line. It will be scattered due to refraction by the polymer, carbon and silica components and will exit the optical fiber at a scattering angle $\theta$ with respect to center-line 29.

Referring to FIG. 3, it can be shown that, for light passing transversely through the glass fiber, the scattering angle $\theta$ increases with the distance x until some maximum angle $\theta_n$ is reached. As x increases further, the angle $\theta$ falls as shown in the graph. The same is true of negative values of x, below the center-line, which produce negative angles $\theta$. FIG. 4 shows a graph of the forward-scattered light intensity versus the angle $\theta$. Ordinate 32 represents the point at which the angle $\theta$ equals 0, while ordinates 33 and 34 represent values of $\theta$ of $+\theta_n$ and $-\theta_n$, respectively.

Curve 36 illustrates a typical distribution of light intensity versus $\theta$ for an optical fiber in which there is no carbon coating 28 as indicated in FIG. 2. Maximum light intensities are symmetrically disposed about Line 32 at $+\theta_n$ and $-\theta_n$, and the light intensity at all angles is comparatively high. If, in FIG. 2, rather than a laser ray 30 of infinitely small diameter, we were to consider a collimated light beam having a uniform intensity across its thickness and having a thickness approximately equal to that of the coated optical fiber 12', the total distributed forward-scattered light would correspond to Curve 36 if there were no carbon coating and if the polymer coating 27 were concentric with the silica portion 26. Line 32 of course represents the point at which the scattering angle is zero, which corresponds to center-line 29 of FIG. 2. It can be shown that if there is a lack of concentricity of the polymer coating 27 with respect to the silica portion 26, the regions of maximum intensity shown by lines 33 and 34 will not by symmetrical, as shown, with respect to center-line 32. As described in the paper "High Speed Measurement and Control of Fiber-Coating Concentricity," by D. H. Smithgall and R. E. Frazee, the *Bell System Technical Journal*, Volume 60, No. 9, November 1981, pages 2065–1080, advantage may be taken of this phenomenon to detect and automatically correct for lack of concentricity of the polymer coating.

For purposes of the present invention, however, note is taken instead of the total energy of the forward-scattered modes, which may be taken as being proportional to the area under curve 36. As mentioned before, we have observed that the energy of the forward-scattered laser light is monotonically inversely proportional to the thickness of the carbon coating 28. Thus, if a carbon coating 28 of a given thickness is applied, curve 36 will fall to the relative position shown, for example, by curve 36A. If the carbon thickness were increased further, the total intensity of the forward-scattered light would reduce further, and the curve would fall to the position such as that shown by curve 36B. In the apparatus of FIG. 1, we take advantage of this phenomenon to control automatically the thickness of the carbon coating on the optical fiber 26. It should be noted that FIG. 4 does not illustrate the intensity of the non-scattered laser light; if this were included in FIG. 4, it would appear as an intensity spike centered about line 32 having a thickness related to the thickness of the laser beam. It should also be noted that, as used herein, forward-scattered light means all light from a collimated beam that is refracted or otherwise deflected from its propagating direction by the fiber and which impinges on a reference plane on a side of the fiber opposite the light source.

Figure 5:
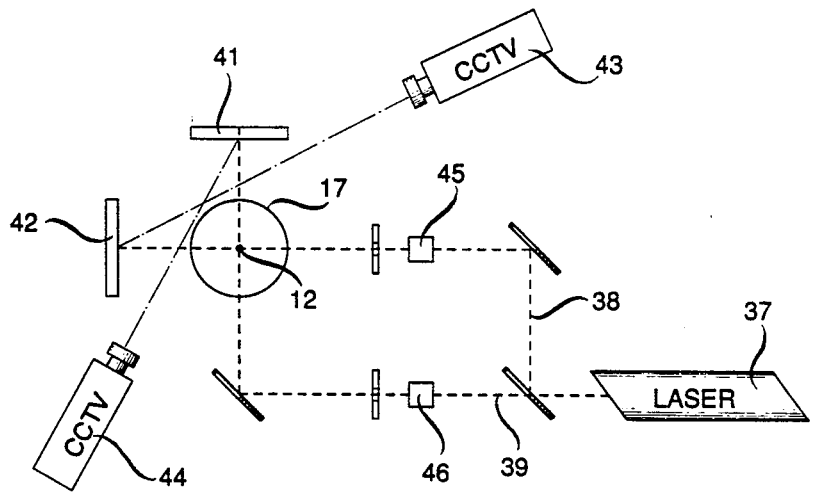
FIG. 5 is a schematic view of apparatus for detecting forward-scattered light in accordance with one embodiment of the present invention.

Another advantage of our invention is that carbon coating thickness can be monitored by the same equipment that is used to monitor polymer coat concentricity as described in the aforementioned Smithgall et al. article. The optical layout of such apparatus is shown in FIG. 5, in which the output of a laser 37, typically a 1 milliwatt helium-neon laser, is split into two components 38 and 39 which are each reflected to intersect at the central axis of the fiber 12. Located approximately 4 centimeters from the fiber are viewing screens 41 and 42. The screens may be white bond paper which provides a high contrast background and partially diffuses the scattering pattern, eliminating the fine structure corresponding to interference of refracted and reflected rays. The glass fiber diameter is illustratively 125 microns, coated diameter 250 microns, and laser beam diameter 800 microns. The scattering pattern as viewed on the screen appears as a bright bar on either side of the very bright central spot, the central spot representing the unscattered light and the two bright bars representing intensity maxima as shown in FIG. 4.

The scattering pattern on screen 42 is viewed by a closed circuit television camera 43, and the pattern on screen 41 is viewed by a television camera 44. The camera views the screen through a 0.633 micron interference filter which permits the device to operate in normal room lighting conditions, while only the scattering pattern is observed. The camera is mounted such that the scattering pattern is crossed by a multiplicity of vertical scan lines (the symmetry of the intensity patterns around the center-line as illustrated in FIG. 4 is arbitrarily taken as defining the horizontal direction). Thus, along each scan line the intensity of the pattern is sampled once. By extracting this information from the camera output, the scattering pattern can be reconstructed to give the intensity distribution as shown in FIG. 4. Furthermore, the location of important features within the pattern can be determined by counting the number of samples, or scan lines, between features. With the full-field view of the camera, the detector is insensitive to tilt in the scattering pattern resulting from an angularly misaligned camera or optical fiber.

To align the laser beams to the coated fiber, rotatable cubes 45 and 46, each mounted on the shaft of a small servo motor, is located in each optical path. An aperture between the cube and the viewing screen eliminates spurious scattering effects from the corners of the cube.

The output of each of the cameras 43 and 44 is processed identically; FIG. 6 is a functional block diagram showing the processing of the output of one of the cameras. The composite video signal is separated into video and synchronization components by a video separator 49 and a synchronization separator 50. The video portion of the signal is directed to two separate integrator circuits 52 and 53. Integrator 53 sums the collective value of all of the video pulses contained in one complete vertical field. Therefore, the output voltage of integrator 53 is proportional to the total energy contained in the forward-scattered pattern. This signal is directed to the computer through an analog-to-digital (A/D) converter. The second integrator 52 sums the signal levels contained in each vertical scan line. The output, controlled by line synchronization pulses to form a serialized box car representation of the envelope, is directed to a high-speed A/D converter 55, which converts each scan line level to eight bits of binary data, which are directed to the computer. The video scan line is conditioned at the scan rate of approximately 63 microseconds.

As described in the aforementioned Smithgall et al. article, the computer can from this data develop a signal for changing the eccentricity of the fiber with respect to the polymer coating. Likewise, the computer is used to control the valve 24 of FIG. 1. This will normally require conversion of the computer output from a digital to an analog signal so as to drive, for example, a solenoid that may control valve 24 in a monotonic inverse relationship to the detected light intensity, as described before. It should be noted that the use of two laser beams at right angles for detecting coating thickness is preferable to simply using one beam, since it can be used better to detect non-uniform coatings. The computer will develop a signal based on a sum of both video outputs, which is normally more representative of coating thickness around the entire periphery of a given sample than only one video output would be.

While the use of television cameras to detect light intensity has been discussed in some detail, it should be understood that a more straight-forward use of photodetectors could be considered advantageous. Photodetectors of course inherently generate an electrical signal proportional to light intensity, and an electrical inverter would convert such signal to be inversely proportional to light intensity. It is to be understood that the monotonic inverse proportionality that we have discovered is not necessarily a linear proportionality. Also, flow rate of acetylene in FIG. 1 is not necessarily linearly proportional to coating rate. Since other relevant parameters such as fiber temperature, coating chamber configuration, draw rates etc., can affect coating thickness, it is preferred that the functional relationship between generated electrical signal and coating thickness be empirically derived for each process under consideration. This can be done by comparing various coating thickness as measured electrically with the generated electrical signals. Alternatively, the relevant relationships can be derived mathematically.

While the laser is the most practical device for forming a collimated light beam, in principle, other devices could alternatively be used. It may be desirable to screen the non-scattered laser beam so as to obtain a total integrated intensity that is more sensitive to changes in carbon coating thickness. On the other hand, because of the Gaussian distribution of light intensity within most laser beams, if the beam is centered on the fiber, a large proportion of the light intensity will be transmitted through the carbon coating even if the thickness of the beam is significantly larger than the carbon coating diameter; this means that a large proportion of the detected light will be forward-scattered light even if the non-scattered portion is not screened out. Other modifications and embodiments may be made by those skilled in the art without departing from the spirit and scope of the invention.

We claim:

1. A method for making optical fibers comprising the steps of drawing a glass fiber from a heated glass body, directing the fiber through a coating chamber, exposing the fiber in the coating chamber to a carbon-containing gas compound, thereby to coat the glass fiber with a carbonaceous coating to a thickness of 1000 angstroms or less, and thereafter coating the glass fiber with a polymer coating, characterized by:

directing a laser beam at the fiber after it has been coated with polymer, the impingement of the beam on the optical fiber resulting in a forward-scattered light pattern;

using the intensity of said pattern to generate a signal which is a function of the thickness of the carbonaceous coating;

and using the signal to control the thickness of the carbonaceous coating in the coating chamber.

2. The method of claim 1, further characterized in that:

as the fiber is directed through the coating chamber, the coating is made by contacting the fiber with a gas containing carbon so as to form a carbonaceous coating on the fiber.

3. The method of claim 2, further characterized in that:

the signal is used to control the flow of the gas to the coating chamber.

4. The method of claim 3, further characterized in that:

the gas includes acetylene.

5. The method of claim 3 further characterized in that:

the uncoated glass fiber has a diameter of approximately 125 microns and the outer diameter of the polymer coating is approximately 250 microns.

6. The method of claim 3 further characterized in that:

the intensity of the forward-scattered light is detected by inserting a screen in the path of the forward-scattered light and directing a television camera at the screen, and the signal is a first electrical output signal of the television camera which is a function of the forward-scattered light intensity, such intensity being monotonically inversely proportional to the thickness of the carbonaceous coating.

7. The method of claim 6 further characterized in that:

the first electrical output signal of the television camera is directed to a computer which generates a second electrical signal and the second electrical signal controls a valve that controls the flow of carbon-containing gas into the coating chamber.

8. The method of claim 3 further characterized in that:

the laser beam is split into two components which are directed at the optical fiber at right angles to each other;

the forward-scattered light from each of the laser beams is detected by locating two screens such that each screen intercepts forward-scattered light from one of the two laser beam components;

and two television cameras are used to generate third electrical signals indicative of the intensity on the two screens;

the third electrical signals being combined to form said signal which is a function of the thickness of the coating.

* * * * *